Figure 4:
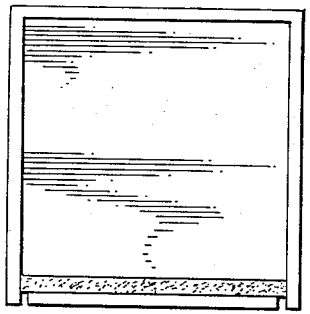

United States Patent [19]
Hiller

[11] 3,810,539
[45] May 14, 1974

[54] PHOTOGRAPHIC SLIDE CONTAINER AND TRANSFER DEVICE

[76] Inventor: P. Russell Hiller, 1028 508th St., Allentown, Pa. 18103

[22] Filed: Apr. 26, 1972

[21] Appl. No.: 247,601

[52] U.S. Cl.................. 206/73, 24/263, 294/87 R, 353/103
[51] Int. Cl..... B65d 1/22, B66f 19/00, G03b 23/00
[58] Field of Search.................. 206/73; 24/263 PC; 294/87 R; 353/103

[56] References Cited
UNITED STATES PATENTS

| | | |
|---|---|---|
| 3,133,332 | 5/1964 | Johnson ...................... 294/87 R X |
| 3,552,846 | 1/1971 | Hansen .............................. 353/103 |
| 3,711,905 | 1/1973 | Eckerdt et al. ................ 24/263 PC |

Primary Examiner—Leonard Summer

[57] ABSTRACT

A rectangular box-like container, for storing and transferring photographic slides to a stack loader for a slide projector, has a bottom, four sides and an open end for receiving the slides. One of the sides is slotted inwardly from the open end and immediately adjacent its adjacent sides so that it may be flexed inwardly by finger pressure to grip the contained slides. A pad of resilient material may be affixed to the inner surface of the slotted side adjacent the open end to provide accommodation for possible slight variations in the size of the slides.

2 Claims, 4 Drawing Figures

PHOTOGRAPHIC SLIDE CONTAINER AND TRANSFER DEVICE

DESCRIPTION OF PRIOR ART

Slides of this general type, such as the well-known transparent slides mounted in cardboard frames, are exhibited most conveniently by automatic projectors which receive a group of slides and which project the slides in sequence in an automatic or semi-automatic slide changer. It is common practice to facilitate such exhibition by storing the groups of slides in individual trays known as magazines. These magazines have individual compartments into which the slides are arranged, some of these magazines are linear, some circular. These magazines serve both for storage and for automatic exhibition. These magazines, however, require considerable storage space and also represent an appreciable cost in themselves where they may be required in large quantities. It is, therefore, desirable in many instances to have a system which eliminates the need for magazines and which at the same time permits slides to be both exhibited conveniently and stored in a minimum of space.

Accordingly, an object of the present invention is to provide an inexpensive container that will permit transferring pre-determined groups of slides to the feed chamber of a magazineless changer, generally known as a "stack holder". After being exhibited they may be transferred back to the same container and stored in a space little more than the physical size of the slides themselves.

SUMMARY OF THE INVENTION

It is an object of this invention to provide a photographic slide storage container that is easy to grasp and simple to operate.

It is also an object of this invention to provide a photographic slide container that is very inexpensive to produce by modern production methods and occupies a minimum of storage space.

It is another object of this invention to provide a photographic slide container that will release or retain the slides by the application or releasing of finger or thumb pressure.

It is also another object of this invention to provide a photographic slide container that will store and release as few as one photographic slide or the maximum number of slides the container will accommodate, and any number in between.

The above and other objects of this invention are realized by the container shown in the accompanying drawing.

Figure 3:
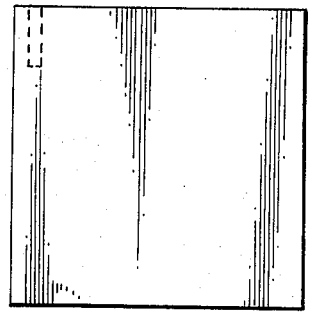
Figure 2:
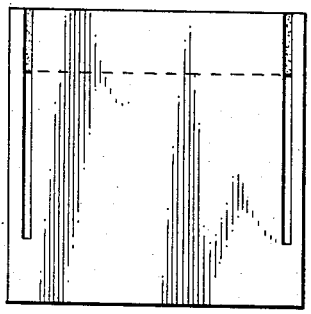
Figure 1:
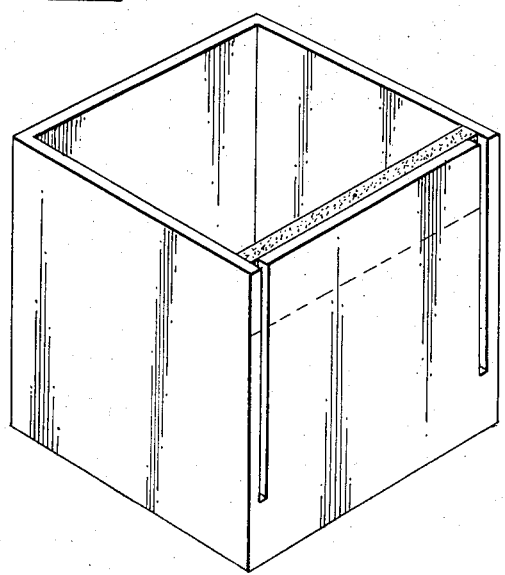

The drawing, FIG. 1 shows a perspective view of the photographic slide container. FIG. 2 shows a front elevation view of the photographic slide container. FIG. 3 shows a side elevation view of the photographic slide container. FIG. 4 shows a top plan view of the photographic slide container.

The drawing, FIGS. 1, 2, 3, and 4, show a simple box, one side of the box has narrow through slots on either side, in line with the inside surface of adjacent sides. These slots make this side of the box flexible. The upper, inside surface of this slotted side has a portion of resilient material affixed to it. A cover will be used for the protection of the slides, (not shown). Any suitable method of holding a cover would be satisfactory as the cover in no way influences the principle of this invention.

In use the container is filled or "loaded" by grasping the container with the hand across the bottom or closed end, the thumb on the slotted side, the fingers on the side opposite the slotted side. Hold the container with the open side up, approximately as shown in the perspective view. FIG. 1. Insert the photographic slides or transparencies, the top edge first, the forward side down. Insert as many as you wish up to the maximum acceptable.

To insert the group of transparencies into the feed chamber of a slide projector, (not shown), apply pressure with the thumb to the flap created by the slotted sides of the container. Rotate the hand so the container is in an inverted position, (open side down), the slides will not fall out as they are retained by the pressure of the thumb against the flap, springing the flap. The resilient material on the inside of the flap will accommodate to any production variation in the physical size of the slides. Hold the inverted container over the slide feed chamber of the projector. Release the pressure of the thumb and the slides will drop by gravity into the feed chamber. The slide container is laid aside until needed to move the stack of slides from the magazine after projection. An alternate method would be to hold the inverted container about one inch above any flat surface, release the pressure applied by the thumb, the slides will drop approximately one half way out of the container, apply thumb pressure, hold the slides in this position while they are inserted into the slide feed chamber.

To return the slides to the container for storage, drop the open end of the container over the slides as far as it will drop, in the same position as when the slides were placed into the feed chamber. Apply pressure with the thumb, raise the container with the slides confined by the pressure of the resilient material, rotate the hand so the open side of the container is on top, release the pressure of the thumb and the slides will fall by gravity to the bottom of the container. Replace the cover.

Having described my invention, it's use and operation

I claim:

1. An improved slide container and transfer device for storing and releasably holding a group of slides, said container consisting of an integral, substantially rectangular, box-like configuration, having a bottom and four sides, the free edges of said sides lying in a substantially common plane parallel with said bottom to define one open end, at least one side adjacent to the open end having a thru slot located in a plane immediately adjacent the inner surface of each of its adjacent sides, said slots beginning at the open end and extending in the direction of the closed end of the container leaving said side unconnected to its adjacent sides for a substantial portion of the distance from the open end to the closed end of the container, the flexibility provided by this slotted side allowing pressure of the thumb or fingers to urge this side in the direction of the opposite side of the container confining the slides contained therein.

2. An improved slide container and transfer device as defined in claim 2, further consisting of a portion of resilient material being affixed to the inner surface of the slotted side, adjacent to the open end.

* * * * *

UNITED STATES PATENT AND TRADEMARK OFFICE
CERTIFICATE OF CORRECTION

PATENT NO. : 3,810,539
DATED : May 14, 1974
INVENTOR(S) : P. Russell Hiller

It is certified that error appears in the above—identified patent and that said Letters Patent is hereby corrected as shown below:

On the title page, the inventor's address should read:

-- 1028 South 8th Street, Allentown, Pa. 18103 --.

Signed and Sealed this

Twelfth Day of May 1981

[SEAL]

Attest:

RENE D. TEGTMEYER

Attesting Officer

Acting Commissioner of Patents and Trademarks